United States Patent
Park et al.

(10) Patent No.: US 7,124,346 B2
(45) Date of Patent: Oct. 17, 2006

(54) APPARATUS FOR TRANSMITTING AND RECEIVING WIRELESS DATA AND METHOD THEREOF

(75) Inventors: Jeong-hoon Park, Suwon (KR); Dong-seek Park, Suwon (KR)

(73) Assignee: Samsung Electronics, Co., Ltd., Kyungki-do (KR)

(*) Notice: Subject to any disclaimer, the term of this patent is extended or adjusted under 35 U.S.C. 154(b) by 883 days.

(21) Appl. No.: 09/783,126

(22) Filed: Feb. 15, 2001

(65) Prior Publication Data

US 2001/0054162 A1   Dec. 20, 2001

(30) Foreign Application Priority Data

Jun. 10, 2000   (KR)   ................................ 2000-31952

(51) Int. Cl.
*H03M 13/00* (2006.01)
*H03M 13/03* (2006.01)

(52) U.S. Cl. ................ 714/758; 714/786; 714/799; 714/52

(58) Field of Classification Search ............ 714/8, 714/799, 758, 786, 52
See application file for complete search history.

(56) References Cited

U.S. PATENT DOCUMENTS

| | | | |
|---|---|---|---|
| 6,313,768 B1 * | 11/2001 | Allen | 341/78 |
| 6,515,972 B1 * | 2/2003 | Gage et al. | 370/328 |
| 6,519,223 B1 * | 2/2003 | Wager et al. | 370/216 |
| 6,542,490 B1 * | 4/2003 | Ahmadvand et al. | 370/338 |
| 6,553,038 B1 * | 4/2003 | Fukuda | 370/465 |
| 6,590,882 B1 * | 7/2003 | Fong et al. | 370/335 |
| 6,606,311 B1 * | 8/2003 | Wang et al. | 370/338 |
| 6,665,313 B1 * | 12/2003 | Chang et al. | 370/469 |
| 6,765,909 B1 * | 7/2004 | Sen et al. | 370/392 |
| 6,778,558 B1 * | 8/2004 | Balachandran et al. | 370/470 |
| 6,781,971 B1 * | 8/2004 | Davis et al. | 370/329 |
| 6,785,227 B1 * | 8/2004 | Lu et al. | 370/229 |

FOREIGN PATENT DOCUMENTS

JP    62-193336    8/1987

(Continued)

OTHER PUBLICATIONS

Seytter, F. "*An Efficient Multiplex Architecture For Mobile MPEG-4 Systems—Image Communication*," Signal Processing. Image Communication, Elsevier Science Publishers, Amsterdam, NL, vol. 14, No. -8, May 1999, pp. 599-606.

(Continued)

*Primary Examiner*—Albert Decady
*Assistant Examiner*—Esaw Abraham
(74) *Attorney, Agent, or Firm*—Sughrue Mion, PLLC

(57) ABSTRACT

A method for transmitting/receiving wireless data and an apparatus therefor according to the quality of an application service and features of a coder/decoder (CODEC) of an application layer are provided. The method for transmitting/receiving wireless data includes the steps of: establishing a catalog of information related to the application data service; adding header information of each layer by referring to the catalog established in the above step, and error detecting codes to the application data; deciphering a header if data errors are detected by the error detecting codes added to the data during the reception, and transmitting the data to the upper ranking layer according to the quality of service, if the deciphered value of the header belongs to the catalog established in the above step.

39 Claims, 4 Drawing Sheets

FOREIGN PATENT DOCUMENTS

| | | |
|---|---|---|
| JP | 3-13142 | 1/1991 |
| JP | 10-242946 | 9/1998 |
| JP | 10-313294 | 11/1998 |
| JP | 11-27243 | 1/1999 |
| JP | 11-154935 | 6/1999 |

OTHER PUBLICATIONS

Sun, Z., et al. "*Adaptive Two-Level Unequal Error Protection Convolutional Code Scheme for Wireless ATM Networks*," Infocom 2000. Nineteenth Annual Joint Conference of the IEEE Computer and Communications Societies. Proceedings. IEEE Tel Aviv, Israel Mar. 26-30, 2000, Piscataway, NJ, USA, pp. 1693-1697.

Han, J.K., et al. "*Networking Applications of the Hierarchical Mode of the JPEG Standard*," Computers and Communications, 1996., Conference Proceedings of the 1996 IEEE Fifteenth Annual International Phoenix Conference on Scottsdale, AZ, USA Mar. 27-29, 1996, New York, NY, USA, IEEE, US Mar. 1996, pp. 58-64.

Ducla-Soares, L., et al. "*Error Resilience and Concealment Performance for MPEG-4 Frame-Based Video Coding*," Signal Processing. Image Communication, Elsevier Science Publishers, Amsterdam, NL, vol. 14, No. 6-8, May 1999.

\* cited by examiner

APPARATUS FOR TRANSMITTING AND RECEIVING WIRELESS DATA AND METHOD THEREOF

BACKGROUND OF THE INVENTION

1. Field of the Invention

The present invention relates to a system for transmitting/receiving wireless data, and more particularly, to a method for transmitting/receiving wireless data according to the quality of an application service and a feature of an application layer coder/decoder (CODEC), and an apparatus thereof. The present application is based on Korean Patent Application No. 2000-31952 filed on Jun. 10, 2000, which is incorporated herein by reference.

2. Description of the Related Art

Generally, a transmitting terminal of a edma (code-division multiple access) telecommunication system transmits data through an application layer, a radio link protocol layer, an MUX sub layer, and a physical layer. That is, the application layer is a CODEC-related standard such as H.324M, H.323, and T.120. The physical layer 140 of FIG. 1 is a portion for performing channel coding, PN (pseudo noise) spreading and modulation, and also includes a portion for performing an air interface.

A radio link protocol (RLP) layer includes a signaling portion, and converts a payload of the application layer transmitted by a radio channel into an input format of the physical layer. The RLP layer has an RLP per N number of application layers, and is connected to the physical layer through the MUX sub layer. The MUX sub layer adaptively multiplexes an RLP received from the RLP layer into a protocol data unit (PDU).

The cdma telecommunication system checks for errors in the physical layer. Here, data which is determined to have errors in the physical layer by cyclic redundancy code (CRC) information cannot be transmitted to the upper layer if the MUX sub layer does not include a CRC field. Also, if errors are included in the MUX sub layer including the CRC field, data is not transmitted to the upper layer. Therefore, the amount of overall data which is transmitted from the transmitting portion to the receiving portion is decreased by performing an error check of the CRC field.

SUMMARY OF THE INVENTION

To solve the above problems, it is an objective of the present invention to provide a method for transmitting/receiving wireless data which transmits data belonging to the established header information catalog by cataloging header information of data used for transmission and determining a standard of judgement, regardless of the error of the payload, according to the quality of service.

It is another objective of the present invention to provide an apparatus for transmitting/receiving wireless data using the above method.

Accordingly, to achieve the above objective, there is provided a method for transmitting/receiving wireless data, wherein the method for transmitting/receiving includes the steps of:

establishing a catalog of information about the application data service;

adding the header information of each layer and error detecting codes to the application data by referring to the determined catalog in the above step; and deciphering a header if data errors are detected by the error detecting codes added to the data during reception, and transmitting data to the upper layer according the quality of service if the deciphered value of the header belongs to the established catalog in the above step.

To achieve another objective, there is provided a method for transmitting wireless data, wherein the method for transmitting wireless data includes the steps of:

establishing a catalog of information about the application data service;

establishing a payload, including the application data, and adding header information about the data by referring to the established catalog; and adding the error detecting codes to the payload formed in the above step, and performing a channel coding.

To achieve another objective, there is provided a method for receiving wireless data in the wireless data system that includes a catalog of information about the application data service, wherein the method for receiving wireless data includes the steps of:

determining data errors in each layer by the error detecting codes added to the data after channel-decoding the received data;

deciphering header information in each layer when the data errors are detected;

transmitting data to the upper layer according to the quality of service if the header information deciphered in each layer in the above step belongs to the catalog; and decoding the data transmitted in the above step.

To achieve another objective, there is provided an apparatus for transmitting and/or receiving wireless data, wherein the apparatus for transmitting/receiving wireless data includes:

means for transmitting the application data, to which the header information of each protocol layer and the error detecting codes are added, by referring to a catalog, after establishing a catalog of information about the application data service; and means for receiving that decipher the header if data errors are detected by the error detecting codes of the application data received from the means for transmitting the application data, and decoding the data according to the quality of service if the deciphered value belongs to the established catalog.

BRIEF DESCRIPTION OF THE DRAWINGS

The above objective(s) and advantages of the present invention will become more apparent by describing in detail a preferred embodiment thereof with reference to the attached drawings in which.

DETAILED DESCRIPTION OF THE INVENTION

Figure 1:
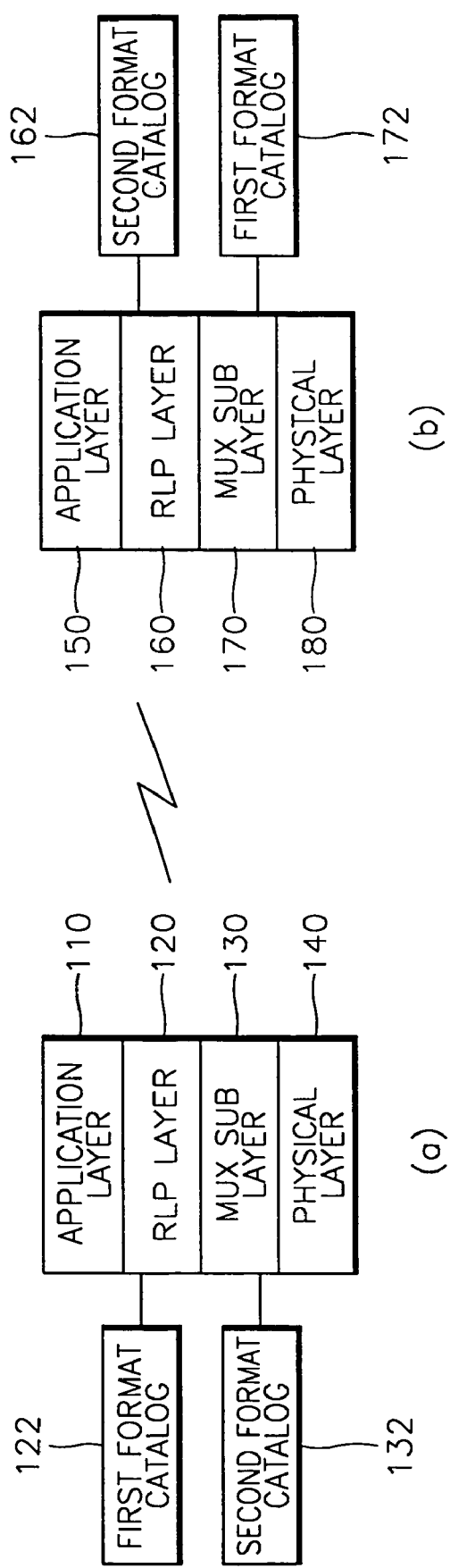
FIG. 1 is an overall structural diagram showing an apparatus for transmitting/receiving wireless data according to the present invention.

FIG. 1 is an overall structural diagram showing an apparatus for transmitting/receiving wireless data according to the present invention.

Referring to FIG. 1, a transmitting terminal (a) and a receiving terminal (b) include a service catalog indicating the quality of service (QoS), such as the delay time of data transmitted, and an error generation probability of data which will be used.

The transmitting terminal (a) conveys data through an application layer 110, an RLP layer 120, an MUX sub layer 130, and a physical layer 140, and includes a first format catalog 122 and a second format catalog 132 which catalog information related to the data service used for transmitting to the RLP layer 120 and the MUX sub layer 130, respectively.

The receiving terminal (b), or a repeater (b), conveys data in the order of the physical layer 180, the MUX sub layer 170, the RLP layer 160, and the application layer 150, and compares header information of received data with the value of the catalog, including a first format catalog 172 and a second format catalog 162 which catalog information about the data service in the MUX sub layer 170 and the RLP layer 160, respectively.

FIGS. 2(a)–(d) illustrate a protocol format formed by passing through each layer of the transmitting terminal of FIG. 1. FIG. 2, (a) is a protocol format of the application layer 110. FIG. 2 (b) is a protocol format of the RLP layer 120 formed of a RLP header and the payload, and the CRC is added for protecting the RLP header information. FIG. 2 (c) is a protocol format in the MUX sub layer 130 formed of a MUX header and the payload, and the CRC is optionally added to the payload. FIG. 2 (d) is a protocol format of the physical layer 140 formed of a physical layer header and the payload, and the CRC is added to the payload.

Figure 2:
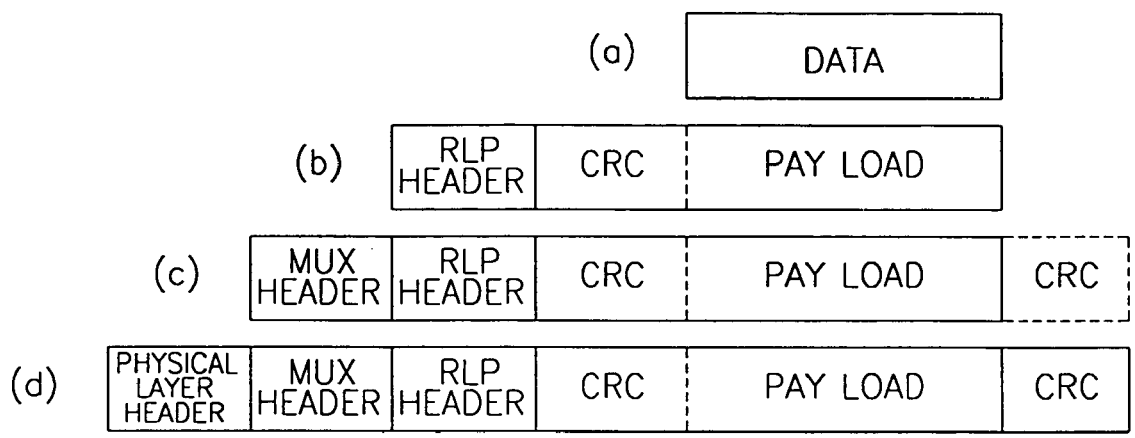
FIGS. 2(*a*)–(*d*) illustrate a protocol format formed by passing through each layer of the transmitting terminal of FIG. 1.
Figure 3:
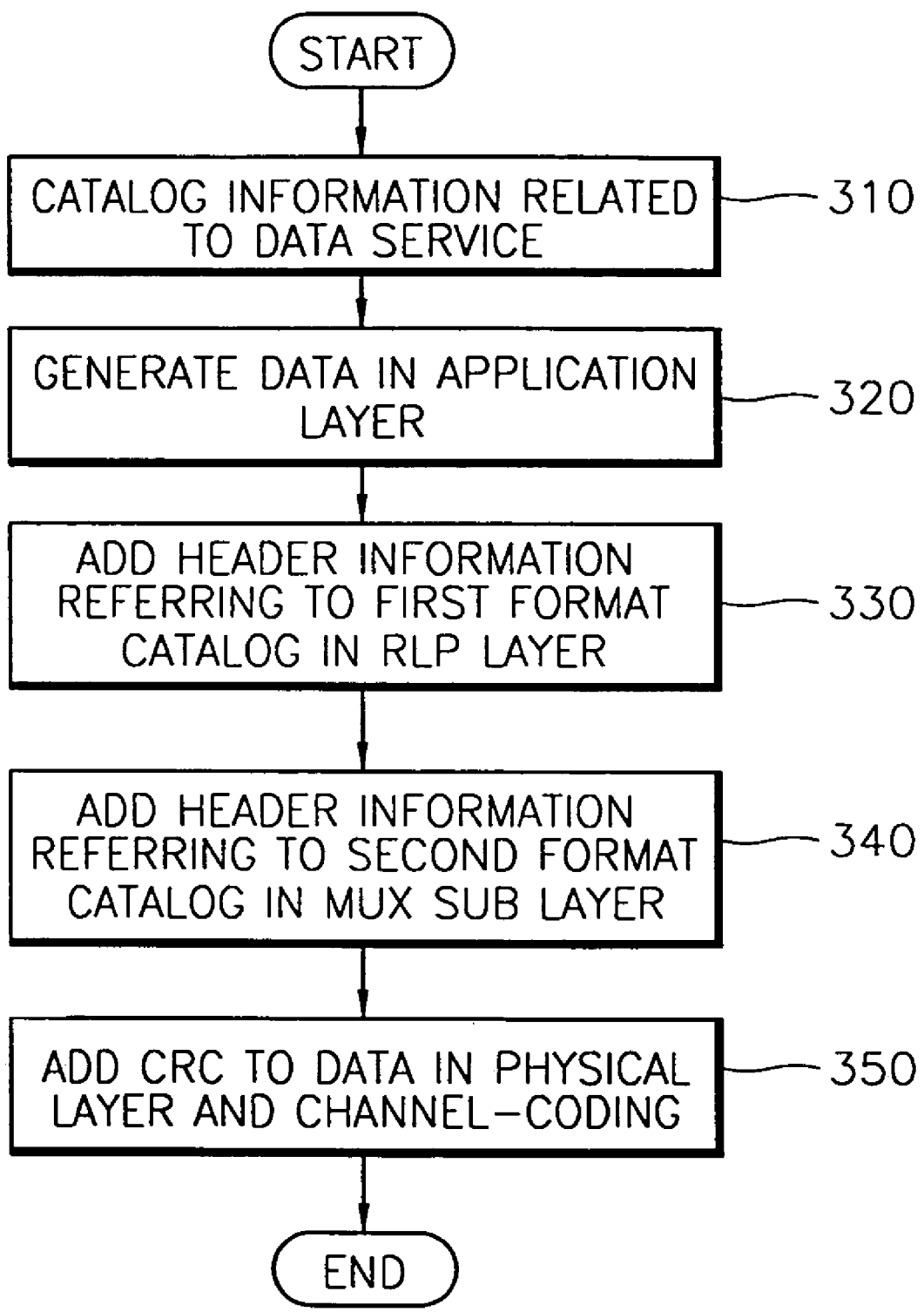
FIG. 3 is a flowchart showing a method for transmitting wireless data according to the present invention.

FIG. 3 is a flowchart showing a method for transmitting wireless data according to the present invention, and it will be described with reference to FIGS. 1 and 2.

First, the information related to the data service is established as the first format catalog 122, the second format catalog 132, and the service catalog (not shown) (step 310). For example, the payload size divided from the RLP is included in the first format catalog 122, a service index which designates the application data multiplexed in the MUX sub layer is included in the second format catalog 132, and the QoS parameter, such as a delay time of data which will be transmitted, and an error generation probability of data, is included in the service catalog (not shown).

Next, data is generated in the application layer 110 and transmitted to the lower ranking RLP layer 120 (step 320).

Next, the data received in the application layer 110 is formed of the payload in the RLP layer 120, and transmitted to the MUX sub layer 130 after adding the header information to the data (step 330). Here, information about the RLP established in the first format catalog is established in the header information, and also a field for checking errors can be inserted.

Next, in the MUX sub layer 130, the service index which designates the application data of the data received from the RLP layer 120 is added as the header information, and transmitted to the physical layer 140 (step 340). Here, the field for checking errors can be inserted in the header for protecting the header information. Then, as a preferred embodiment, it can be divided into the first method in which a data error checking function like the CRC is added to the header and the payload, or the entire data, and the second method in which it is not added.

Next, in the physical layer 140, the header and the CRC are added to the data received in the MUX sub layer 130, and transmitted to the receiving terminal through an antenna, channel-coding the entire data (step 350).

Figure 4:
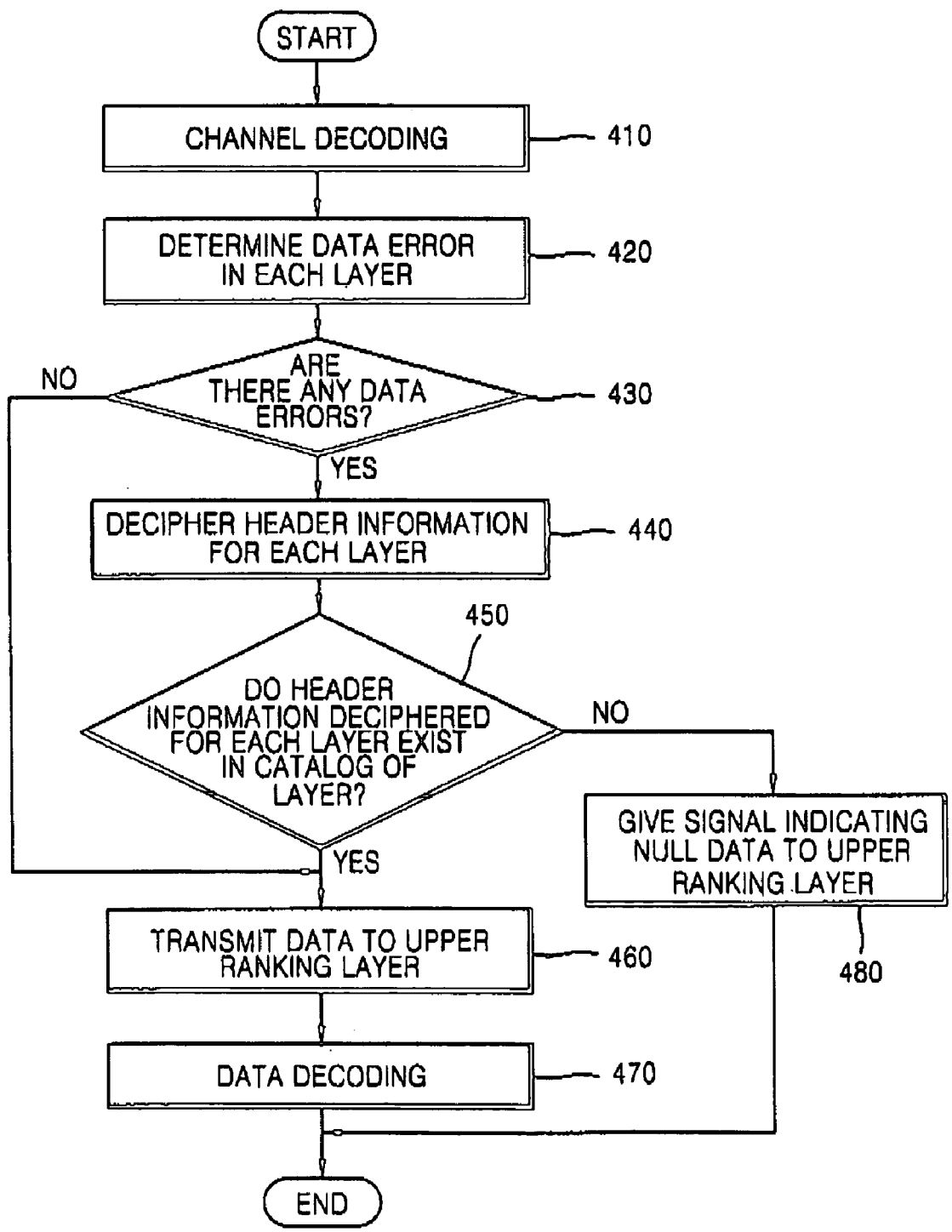
FIG. 4 is a flowchart showing a method for receiving wireless data according to the present invention.

FIG. 4 is a flowchart showing a method for receiving wireless data according to the present invention, and it will be described with reference to FIG. 1.

Before performing the transmitting operation, the receiving terminal includes a first format catalog 172 and a second format catalog 162 having an identical format catalog to that of the transmitting terminal, and also includes a service catalog (not shown) for determining information about the data service received in the transmitting terminal.

In the physical layer 180, the data received in units of a packet is decoded as the header, the payload, and the CRC information through channel-decoding (step 410). In the physical layer 180, a value detected by the data size and the header information, and the data errors detected by the CRC check are transmitted to the MUX sub layer 170 with the data.

Next, in the MUX sub layer 170, it is determined whether there are errors in the data through the CRC information conveyed from the lower ranking physical layer 180 (step 420).

Here, in the MUX sub layer 170, if it is determined that there are no errors in the received data, the data is transmitted to the RLP layer 160, and if it is determined that there is an error, the MUX header information of the received data is deciphered (steps 430, 440). Here, the parameters determined in the first format catalog 172 and the service catalog are applied as a standard of judgement according to the quality of service or the decoder of the application layer in order to determine whether the data will be transmitted to the RLP layer 160.

Next, in the MUX sub layer 170, if the deciphered header information is included in the value stored in the first format catalog 172, the data is transmitted to the RLP layer 160 according to the quality of service as initially established in the service catalog (steps 450, 460).

Next, the RLP header information is deciphered in the RLP layer 160, and if the deciphered header information corresponds to the value determined in the second format catalog 162 which the deciphered header information itself includes, the data is transmitted to the application layer 150, according to the quality of service initially established in the service catalog, regardless of the errors of the payload.

Next, the data received in the application layer 150 is decoded as video or audio data by the decoder (step 470).

Each layer signals null data to the upper ranking layer if the deciphered header information does not exist in each catalog (step 480).

The present invention can check the header information or not according to the kind of the application layer service established in the service catalog before the data is transmitted/received for the first time. That is, if the used service cannot decode bit errors of the payload, or if the quality of service (QoS) wanted by a customer cannot use data having bit errors, the data is conveyed to the upper ranking layer through the CRC check on the entire data. Here, the quality of service must be satisfied by re-transmitting the data having the errors, and thereby, a real time for transmitting the data can be delayed.

If the bit errors of the payload can be sufficiently decoded, and the quality of service desired by a customer is real time transmission of data, data having no errors in the header is transmitted to the upper ranking layer even though there are CRC errors in the entire data.

Also, the present invention establishes the type of service used in the service catalog and the support of the decoder, and can form various types of service. That is, when the error checking function is added to the header information and when an error correcting function is also added to the same, the error correcting function can be used rather than the error checking function if only a little time will be delayed rather than the exact real time.

The method for transmitting data using this type of service and the support of the decoder can be determined through signaling to the repeater during connection to a radio terminal initially, and through the service index added to the header field of the MUX sub layer in the transmitting layer used now. The decoder of the application layer can receive data errors determined in each layer in the signaling method.

The present invention can be written as a program executed in a computer. The program can be executed from a computer readable medium in a general purpose digital computer which operates the computer. Computer readable recording media include magnetic storing media (for example: an ROM, a floppy disc, a hard disc and so on), optical reading media (for example: CD-ROM, DVD and so on), and a carrier wave (for example: a transmission through the internet). Also, recording media, which a computer can read, are dispersed in a computer system connected by a network, and program codes which a computer can read in a dispersing method can be stored and executed.

According to the present invention, contrary to the conventional method, in which data is not transmitted uniformly to the upper layer if it is determined that there are errors through the error check of the entire data, data belonging to the established information catalog is transmitted regardless of the error of the payload, so that the real-time and stable transmission/reception of data is possible according to the quality of service used or decoding method of an application layer.

What is claimed is:

1. A method for transmitting and receiving wireless data comprising the steps of:
   establishing a catalog of information related to an application data service;
   adding header information by referring to the established catalog, and error detecting codes to application data related to the application data service; and
   deciphering a header when data errors are detected by the error detecting codes added to the application data, and transmitting the application data to an upper ranking layer according to a quality of service if the deciphered value of the header belongs to the determined catalog.

2. The method of claim 1, wherein the header information of each layer is added to the application data.

3. The method of claim 2, wherein the error detecting codes are added in a physical layer.

4. The method of claim 2, wherein the catalog is established during a previous transmission/reception of application data, said catalog includes data information related to radio link protocol (RLP) and multiplex (MUX) sub layers.

5. The method of claim 2, wherein the catalog is established during a previous transmission/reception of application data, said catalog includes information related to the quality of service.

6. The method of claim 5, wherein the information related to the quality of service is a delay time value of the transmitted data or an error generation probability value of the transmitted data.

7. The method of claim 2, further comprising a step of signaling null data to the upper ranking layer, if the header information deciphered in each layer does not exist in the catalog.

8. The method of claim 2, further comprising a step of applying a predetermined standard of judgment according to a quality of service or a decoder of the application layer, when the data is transmitted to the upper ranking layer.

9. The method of claim 8, wherein the predetermined standard of judgment is decided by referring to cyclic redundancy code (CRC) information calculated in a physical layer, header fields of each layer, and an initially established data service catalog.

10. The method of claim 8, wherein the predetermined standard of judgment is decided based on whether error correction needs to be performed, as determined by the header fields.

11. The method of claim 1, wherein deciphering the header occurs while receiving the data.

12. The method of claim 11, wherein the error detecting codes are added in a physical layer.

13. The method of claim 11, wherein the catalog is established during a previous transmission/reception of application data, said catalog includes data information related to radio link protocol (RLP) and multiplex (MUX) sub layers.

14. The method of claim 11, wherein the catalog is established during a previous transmission/reception of application data, said catalog includes information related to the quality of service.

15. The method of claim 14, wherein the information related to the quality of service is a delay time value of the transmitted data or an error generation probability value of the transmitted data.

16. The method of claim 11, further comprising a step of signaling null data to the upper ranking layer, if the header information deciphered in each layer does not exist in the catalog.

17. The method of claim 11, further comprising a step of applying a predetermined standard of judgment according to a quality of service or a decoder of the application layer, when the data is transmitted to the upper ranking layer.

18. The method of claim 17, wherein the predetermined standard of judgment is decided by referring to cyclic redundancy code (CRC) information calculated in a physical layer, header fields of each layer, and an initially established data service catalog.

19. The method of claim 17, wherein the predetermined standard of judgment is decided based on whether error correction needs to be performed, as determined by the header fields.

20. The method of claim 1, wherein the error detecting codes are added in a physical layer.

21. The method of claim 1, wherein the catalog is established during a previous transmission/reception of application data, said catalog includes data information related to radio link protocol (RLP) and multiplex (MUX) sub layers.

22. The method of claim 1, wherein the catalog is established during a previous transmission/reception of application data, said catalog includes information related to the quality of service.

23. The method of claim 22, wherein the information related to the quality of service is a delay time value of the transmitted data or an error generation probability value of the transmitted data.

24. The method of claim 1, further comprising a step of signaling null data to the upper ranking layer, if the header information deciphered in each layer does not exist in the catalog.

25. The method of claim 1, further comprising a step of applying a predetermined standard of judgment according to a quality of service or a decoder of the application layer, when the data is transmitted to the upper ranking layer.

26. The method of claim 25, wherein the predetermined standard of judgment is decided by referring to cyclic redundancy code (CRC) information calculated in a physical layer, header fields of each layer, and an initially established data service catalog.

27. The method of claim 25, wherein the predetermined standard of judgment is decided based on whether error correction needs to be performed, as determined by the header fields.

28. A method for transmitting wireless data comprising the steps of:
  establishing a catalog of information related to an application data service;
  establishing a payload, including application data related to the application data service, and adding header information related to the application data by referring to the established catalog; and
  adding error detecting codes to the payload, and performing channel-coding.

29. The method of claim 28, wherein the error detecting codes are added in a physical layer.

30. The method of claim 28, wherein the catalog is established during a previous transmission/reception of application data, said catalog includes data information related to radio link protocol (RLP) and multiplex (MUX) sub layers.

31. The method of claim 28, wherein the catalog is established during a previous transmission/reception of application data, said catalog includes information related to the quality of service.

32. The method of claim 31, wherein the information related to the quality of service is a delay time value of the transmitted data or an error generation probability value of the transmitted data.

33. A method for receiving wireless data in a wireless data system including a catalog of information related to an application data service, comprising the steps of:

determining data errors in each layer using error detecting codes added to received data after channel-decoding the received data;
  deciphering header information in each layer when data errors are detected;
  transmitting data to an upper ranking layer according to the quality of service if the header information deciphered in each layer belongs to the catalog; and
  decoding the transmitted data.

34. The method of claim 33, wherein the catalog is established during a previous transmission/reception of application data, said catalog includes data information related to radio link protocol (RLP) and multiplex (MUX) sub layers.

35. The method of claim 33, wherein the catalog is established during a previous transmission/reception of application data, said catalog includes information related to the quality of service.

36. The method of claim 35, wherein the information related to the quality of service is a delay time value of the transmitted data or an error generation probability value of the transmitted data.

37. The method of claim 33, further comprising a step of signaling null data to the upper ranking layer, if the header information deciphered in each layer does not exist in the catalog.

38. The method of claim 33, further comprising a step of applying a predetermined standard of judgment according to a quality of service or a decoder of the application layer, when the data is transmitted to the upper ranking layer.

39. An apparatus for transmitting and/or receiving wireless data comprising:
  transmitting means for establishing a catalog of information related to an application data service, adding header information of each protocol layer by referring to a catalog, adding error detecting codes to the application data, and transmitting the application data, including the header information and the error detecting codes; and
  receiving means for deciphering a header if data errors are detected by the error detecting codes of the application data received from the transmitting means, and decoding the data according to a quality of service if the deciphered value belongs to the established catalog.

* * * * *